(No Model.)

H. C. PARKER.
COMBINATION ELECTRICAL METER.

No. 536,478. Patented Mar. 26, 1895.

WITNESSES:
H. Walker
W. P. Hutchinson

INVENTOR
H. C. Parker
BY
[signature]
ATTORNEYS.

UNITED STATES PATENT OFFICE.

HERSCHEL C. PARKER, OF BROOKLYN, NEW YORK.

COMBINATION ELECTRICAL METER.

SPECIFICATION forming part of Letters Patent No. 536,478, dated March 26, 1895.

Application filed January 9, 1895. Serial No. 534,290. (No model.)

*To all whom it may concern:*

Be it known that I, HERSCHEL C. PARKER, of Brooklyn, in the county of Kings and State of New York, have invented a new and Improved Combination Electrical Meter, of which the following is a full, clear, and exact description.

My invention relates to improvements in electrical meters, and the object of my invention is to produce a device of the simplest possible character, which may be conveniently arranged for use as a volt-meter, watt meter, ammeter or ohm-meter, and which is adapted to indicate with the utmost nicety the ohms, volts, watts or ampères of an electric current.

To these ends my invention consists of a combination meter which will be hereinafter described and claimed.

Reference is to be had to the accompanying drawings, forming a part of this specification, in which similar figures of reference indicate corresponding parts in all the views.

Figure 1:
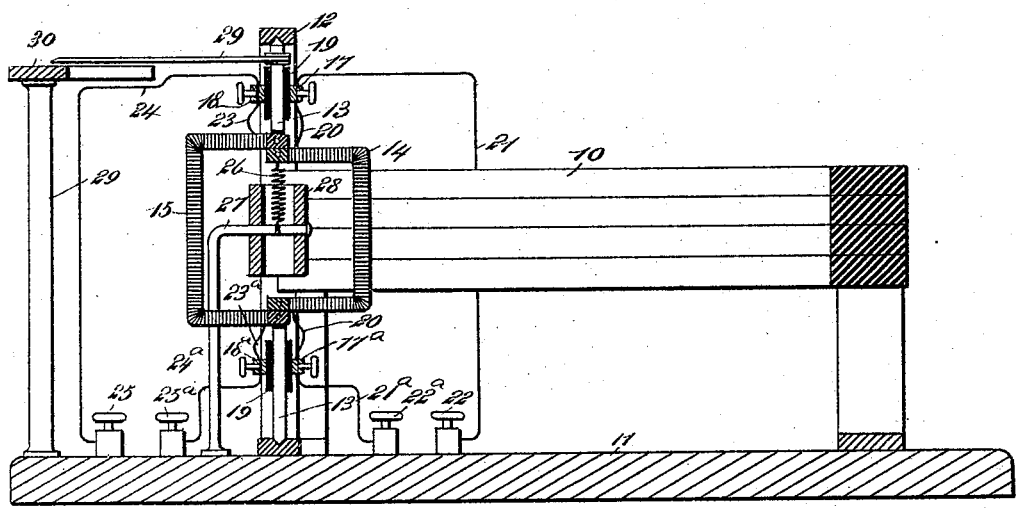
Figure 2:
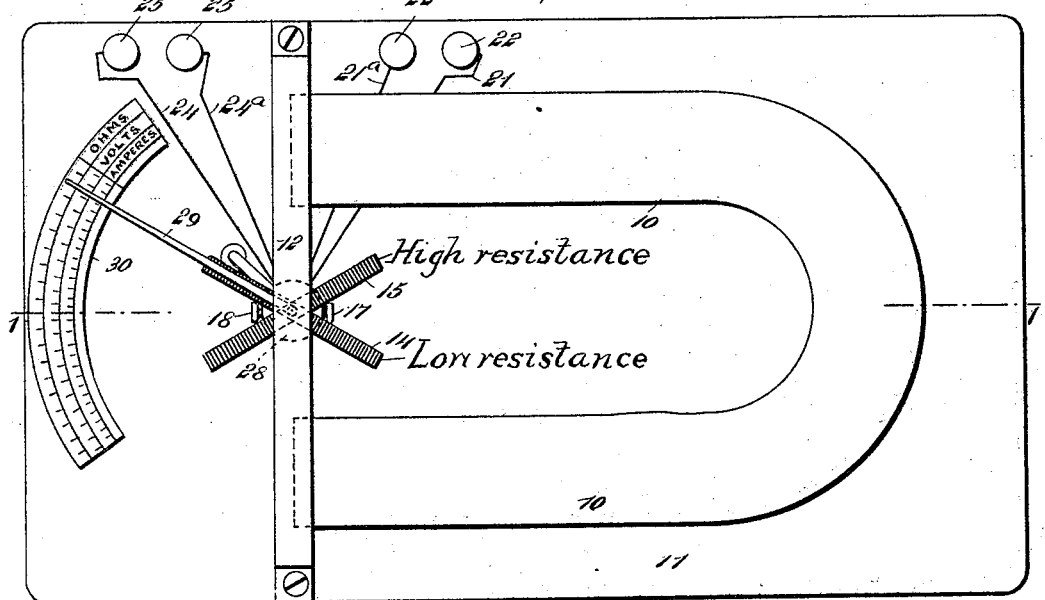
Figure 3:
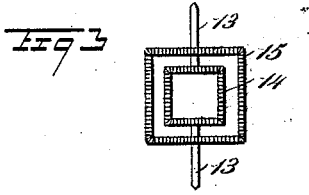

Figure 1 is a vertical longitudinal section of my improved meter. Fig. 2 is a plan view of the same; and Fig. 3 is a detail view of a modified arrangement of coils adapted to make the meter useful as a watt-meter.

My invention consists essentially of a pair of coils wound respectively for low and high resistance, and arranged on a common axis to turn between the poles of a permanent magnet, the coils being arranged to move a hand or indicator over a table of gage marks, and it will of course be understood that the coils and magnets may be arranged in a great variety of ways without affecting the principle of the invention; but in order that a practical machine may be shown, I have illustrated the parts arranged on a base and in a very compact manner.

As illustrated, 10 is a permanent magnet, which is supported on a base 11, and the base is provided with an upright framework 12, which is perpendicular to the base, and in which turn the coils 14 and 15, wound respectively for low and high resistance. The coil 14 is wound for low resistance, or shunts a low resistance, and the coil 15 is wound for high resistance or is arranged in series with a high resistance, both coils being secured to common axles 13 which turn in suitable bearings on the frame 12.

The upper and lower axles 13 are provided with binding posts 17, 17$^a$, 18 and 18$^a$, which are secured to insulating collars 19 on the axles. The binding posts 17 and 17$^a$ are connected by light flexible wires 20, with the coil 14, and the said binding posts connect by wires 21, 21$^a$, with binding posts 22 and 22$^a$ which are adapted to connect with the current wires to be measured, and the binding posts 18, 18$^a$ are connected by wires 23, 23$^a$ with the coil 15, and by wires 24 and 24$^a$ with binding posts 25 and 25$^a$ on the base 11. The coils turn against the tension of a light spring 26, which is secured to the coils and to an adjacent support, such for instance as a bracket 27, which supports the core 28, this being arranged centrally within the coils. The top axle 13 carries a hand 29, which is arranged to move over a table 30, which is marked to indicate ohms, volts and ampères, and may be marked to indicate watts. The current may be brought to the coils through the torsion spring 26 if desired, or the coils may be connected up in any convenient way, the manner of connecting forming no part of the invention.

For use as an ohm-meter the high resistance coil is joined in parallel with the resistance to be measured, and the low resistance coil is joined in series. The action will then be proportional to the ratio of the potential difference to the current, or from Ohm's law $R = \frac{E}{C}$. By giving the coils the proper resistance the deflection will be proportional to the ohms in the circuit, and the ohms will be indicated by the movement of the hand over the table.

For use as an ammeter, the low resistance coil is employed, and for use as a volt meter the high resistance coil is employed, the hand in each case indicating the ampères or volts. For use as a watt meter the coils 14 and 15 are not arranged at an angle to each other, but are placed parallel one with the other, as shown in Fig. 3. Consequently if the high resistance be joined in parallel and the low resistance coil in series, the action will be proportional to the product of the potential difference times the current, that is, to the watts, and the movement of the hand will therefore indicate the watts of the current.

It will be observed that the instrument may be conveniently used for making any of the measurements referred to and that it can always be easily checked by taking readings with known resistances in the circuit. By using the formula watts equal the square of the current multiplied by the resistance. It may also be used for a watt meter.

Having thus described my invention, I claim as new and desire to secure by Letters Patent—

1. An electrical meter, comprising a pair of coils wound respectively for low and high resistance and turning on a common axis between the poles of a magnet, means for connecting a current to the coils, and an indicating hand moved by the coils, substantially as described.

2. A combination electrical meter, comprising a pair of coils wound for low and high resistance and mounted on a common axis, an indicating hand carried by the axis of the coils, means for connecting a current to the coils, a spring to check the movement of the coils, and a magnet embracing the coils, substantially as described.

3. In an electrical meter, the combination of the coils mounted on a common axis and wound respectively for low and high resistance, and a magnet embracing the coils, substantially as described.

4. An electrical meter, comprising a magnet, a pair of rotatively mounted coils arranged in inductive proximity to the magnet, said coils being of different resistances, and an index actuated by the movement of the coils, substantially as set forth.

5. An electrical meter, comprising a magnet, a pair of rotatably mounted coils arranged in inductive proximity to the poles of the magnet, the terminals of each coil being adapted for connection independently of the other coil, and an index actuated by the movement of the coils, substantially as set forth.

6. An electrical meter comprising a magnet, a pair of rotatably mounted coils arranged in inductive proximity to the magnet and having their terminals adapted for connection independently of each other, said coils being of different resistances, and an index actuated by the movement of the coils, substantially as set forth.

7. A combination electrical meter, comprising a magnet, coils mounted to rotate between the poles of the magnet, said coils having their terminals adapted for connection in various ways whereby the instrument is adapted for different purposes, an index actuated by the movement of the coils, and a dial arranged under said index and graduated to different scales corresponding with the different uses of the instrument, substantially as set forth.

HERSCHEL C. PARKER.

Witnesses:
REMSEN RUSHMORE,
JACOB G. PREGENSER.